United States Patent [19]

Denzinger et al.

[11] Patent Number: 5,175,361
[45] Date of Patent: Dec. 29, 1992

[54] PREPARATION OF COPOLYMERS OF MONOETHYLENICALLY UNSATURATED MONOCARBOXYLIC ACIDS AND DICARBOXYLIC ACIDS

[75] Inventors: Walter Denzinger, Speyer; Heinrich Hartmann, Limburgerhof; Wolfgang Trieselt, Ludwigshafen; Albert Hettche, Hessheim; Rolf Schneider, Mannheim; Hans-Juergen Raubenheimer, Ketsch, all of Fed. Rep. of Germany

[73] Assignee: BASF Aktiengesellschaft, Ludwigshafen, Fed. Rep. of Germany

[21] Appl. No.: 625,621

[22] Filed: Nov. 30, 1990

Related U.S. Application Data

[60] Continuation of Ser. No. 303,006, Jan. 30, 1989, abandoned, which is a continuation of Ser. No. 757,199, Jul. 22, 1985, abandoned, which is a division of Ser. No. 666,140, Oct. 31, 1984, abandoned, which is a continuation of Ser. No. 421,101, Sep. 22, 1982, abandoned.

[30] Foreign Application Priority Data

Sep. 28, 1981 [DE] Fed. Rep. of Germany ....... 3138574
Dec. 1, 1981 [DE] Fed. Rep. of Germany ....... 3147489

[51] Int. Cl.$^5$ .................... C07C 55/00; C07C 57/02
[52] U.S. Cl. ..................................... 562/590; 562/595
[58] Field of Search ................................ 562/590, 595

[56] References Cited

U.S. PATENT DOCUMENTS

| | | |
|---|---|---|
| 2,887,480 | 5/1959 | Webster et al. |
| 3,258,491 | 6/1966 | Lacey et al. |
| 3,635,915 | 1/1975 | Gale |
| 3,887,480 | 6/1975 | Rue et al. ............. 252/99 X |
| 3,956,380 | 5/1976 | Henning et al. |
| 4,314,044 | 2/1982 | Hughes ................. 526/317 X |

FOREIGN PATENT DOCUMENTS

| | | |
|---|---|---|
| 2936984 | 4/1981 | Fed. Rep. of Germany |
| 51-140986 | 12/1976 | Japan |
| 1026145 | 4/1966 | United Kingdom |

*Primary Examiner*—Arthur C. Prescott
*Assistant Examiner*—V. Garner
*Attorney, Agent, or Firm*—Oblon, Spivak, McClelland, Maier & Neustadt

[57] ABSTRACT

A process for the preparation of copolymers which contain monoethylenically unsaturated monocarboxylic acids and dicarboxylic acids as copolymerized monomer units, which comprises copolymerizing a) 10 to 60% by weight, based on the sum of the monomers, of a monoethylenically unsaturated dicarboxylic acid of 4 to 6 carbon atoms, -or an alkali metal salt thereof or, an anhydride thereof, b) 90 to 40% by weight of a monoethylenically unsaturated monocarboxylic acid of 3 to 10 carbon atoms or an alkali metal salt thereof and c) 0 to 20% by weight of another monoethylenically unsaturated monomer, not having carboxyl groups and which is copolymerizable with a) and b);

in an aqueous medium in the presence of from 0.5 to 5% by weight, based on monomers, of a water-soluble initiator.

6 Claims, No Drawings

PREPARATION OF COPOLYMERS OF MONOETHYLENICALLY UNSATURATED MONOCARBOXYLIC ACIDS AND DICARBOXYLIC ACIDS

This is a continuation of application Ser. No. 07/303,006, filed on Jan. 30, 1989, now abandoned. Which is a continuation of application Ser. No. 06/757,199, filed on Jul. 22, 1985, now abandoned. Which is a division, of application Ser. No. 666,140, filed Oct. 31, 1984 now abandoned. Which is a continuation of application Ser. No. 421,101, filed Sep. 22, 1982 now abandoned.

The present invention relates to a novel process for the preparation of copolymers of monoethylenically unsaturated monocarboxylic acids and dicarboxylic acids by free radical copolymerization of the monomers in an aqueous medium.

German Laid-Open Application DOS 2,936,984 discloses copolymers of maleic acid and acrylic acid, which are used as scale inhibitors in detergents and cleansers, but does not give a specific method of preparation of these polymers.

German Laid-Open Application DOS 2,212,623 describes a process (cf. Example 3) wherein maleic anhydride and acrylic acid are copolymerized in the presence of benzoyl peroxide, in benzene as the solvent; this is a precipitation polymerization, in which the polymer precipitates as it is formed, because it is insoluble in benzene. A disadvantage of this method is that it necessitates the use of benzene which must subsequently be separated off again. Moreover, the polymers formed have too high a molecular weight, which is detrimental to their performance as scale inhibitors.

U.S. Pat. No. 3,258,491 discloses a process for the preparation of maleic anhydride/vinyl acetate copolymers, wherein polymerization is effected in water in the presence of a redox catalyst.

This reference explicitly points out that the method is only promising if the pH is kept precisely between 3 and 5. U.S. Pat. No. 2,887,480 states that the lastmentioned method is improved if, when copolymerizing maleic acid or anhydride and acrylic acid in an aqueous medium, a free radical initiator, such as potassium peroxydisulfate, is employed in amounts of not less than 17% by weight, based on the sum of the monomers. This very high proportion of initiator not only entails a high consumption of irreversibly destroyed chemicals but also has the disadvantage that because of the high availability of peroxo groups the copolymers obtained undergo excessive chemical change, such as the introduction of carboxyl groups etc.

It is an object of the present invention to provide a process for the preparation of copolymers of monoethylenically unsaturated monocarboxylic acids and dicarboxylic acids in an aqueous medium, which leads, in a very inexpensive manner, to products which are best suited to the use set out in German Laid-Open Application DOS 2,936,984, which is herewith incorporated by reference, namely use as scale inhibitors.

In particular, it is an object of the invention to optimize the process so that the residual content of monomeric dicarboxylic acid is as far as possible below 1.5% by weight. The same problem does not arise in respect of the monocarboxylic acids, since these (acrylic acid or methacrylic acid) polymerize to the extent of virtually 100%.

We have found that these objects are achieved by a process as defined in the claims.

The starting comonomers a) for the process according to the invention are monoethylenically unsaturated dicarboxylic acids, their salts or, if the spatial position of the carboxyl groups (cis-position) permits, their anhydrides, the latter-where they exist-being preferred. Suitable dicarboxylic acids, which contain from 4 to 6 carbon atoms, are, for example, maleic acid, itaconic acid, mesaconic acid, fumaric acid, methylenemalonic acid or citraconic acid. The use of maleic acid or maleic anhydride is preferred.

The starting monomers b) are monoethylenically unsaturated monocarboxylic acids or their salts. They have from 3 to 10 carbon atoms in the molecule; acrylic acid or methacrylic acid are particularly suitable, but vinylacetic acid, or $C_2$–$C_4$-alkyl monoesters of the above dicarboxylic acids, especially of maleic acid, may also be employed. Mixtures of groups a and b can also be added in place of the monocarboxylic acid alone.

For the purposes of the present invention, salts of the carboxylic acids mentioned under a) and b) are alkali metal salts, preferably sodium salts or potassium salts, ammonium salts or organic amine salts, such as those of the tri-$C_1$–$C_4$-alkylamines, mono-, di- or tri-$C_1$–$C_4$-alkanolamines or mixtures thereof. In the text which follows, these will for simplicity merely be referred to as salts.

Amongst the alkali metal salts whose use is preferred, it is advantageous to employ those which are most easily obtainable, namely the sodium or potassium salts, preferably the sodium salts.

Starting monomers c), which need not necessarily be used, are monomers which are free from carboxyl groups, are copolymerizable with monomers a) and b), and are preferably water-soluble. Examples include acrylamide, methacrylamide, acrylamidosulfonic acid, vinylsulfonic acid, allylsulfonic acid, vinylphosphonic acid, allylphosphonic acid, vinyl acetate, hydroxyethyl acrylate, hydroxypropyl acrylate, vinylglycol, methyl acrylate and methyl methacrylate. The sulfonic acids and phosphonic acids mentioned can also, where appropriate, be employed in the form of their alkali metal salts and/or ammonium salts and/or amine salts, provided the degree of neutralization defined in claim 3 is adhered to.

The total charge contains from 60 to 10, preferably from 45 to 20, % by weight of monomers a), from 40 to 90, preferably from 55 to 80, % by weight of monomers b) and up to 20% by weight of monomers c).

Examples of water-soluble free radical initiators are hydrogen peroxide itself, peroxydisulfates, especially sodium or ammonium peroxydisulfate, and azo-bis-(2-aminopropane) hydrochloride. The use of hydrogen peroxide is preferred.

According to the invention, the batch contains from 0.5 to 5% by weight, based on the sum of the monomers, of initiators. The polymerization is carried out in an aqueous medium. The concentration is advantageously such that the aqueous solution contains from 20 to 70% by weight, preferably from 40 to 60% by weight, of total monomers.

Moreover, the conventional aqueous free radical polymerization regulators, such as thioglycollic acid or $C_1$–$C_4$-aldehydes, or chain lengtheners, such as methylene-bis-acrylamide or divinylglycol, may be employed, respectively in amounts of 0.1–2% by weight and 0.5–5% by weight, based on the sum of the monomers.

The polymerization procedure followed is to take an aqueous solution of the dicarboxylic acid, its salt and/or its anhydride and then to add, over 3-10 hours, preferably 5-8 hours, the monocarboxylic acid or its alkali metal salt and the initiator, advantageously also in aqueous solution. Sometimes it is advantageous to add a small proportion of component b), together with a small proportion of initiator, from the very start to the initial charge of component a). The reaction temperature can vary within wide limits but is advantageously from 60° to 150° C., preferably from 100° to 130° C. If the process is carried out above the boiling point of water, a pressure vessel, such as an autoclave, is used for the reaction.

After completion of the polymerization, the batch is rendered more or less strongly alkaline, depending on the end use, unless this pH has already been chosen for the polymerization; if anhydrides were used as starting materials or were formed in the batch, the anhydride groups hydrolyze under these alkaline conditions.

The aqueous polymer solution obtained can be used directly. However, the polymers can also be isolated in a dry form by evaporating the solution, and can, for example, be incorporated into washing powders. Finally, the aqueous solution can also be combined directly with other aqueous solutions containing detergent constituents, and the mixture subjected to conventional spray-drying processes.

In a preferred embodiment of the present invention it is necessary to ensure, in using the monomers a) and b), that they conjointly are 20-80% neutralized, preferably 30-70% neutralized. This can be effected by employing the dicarboxylic acids or a proportion thereof in the form of their salts and the monocarboxylic acids in the free form. However, the converse is also possible, i.e. to use the dicarboxylic acids in the free form or—where possible—as the anhydrides, and the monocarboxylic acids in the form of their salts. In either case it is necessary to ensure that the ratio of free acids to salts corresponds to a total degree of neutralization as defined above.

The copolymers have K values of from 8 to 100, mostly of from 10 to 60. They conform to all the requirements made of good encrusting inhibitors, for example as set out in German Laid-Open Application DOS 2,936,984. The copolymers, especially if the preferred embodiment defined in claim 3 has been followed, contain less than 1.5% of unconverted dicarboxylic acids, which is in itself surprising, if only because-especially if alkali metal salts of dicarboxylic acids, such as maleic acid, are used as starting materials-the converse, namely poorer polymerization, would have been expected, since maleic anhydride is known to polymerize more readily than free maleic acid or its alkali metal salts.

The Examples which follow illustrate the invention. The K value of the completely neutralized salts was determined by the method of H. Fikentscher, Cellulosechemie 13, 60, in 2% strength aqueous solution at 25° C. The monomeric maleic acid content was determined polarographically (see "Polarographische Arbeitsmethoden" by M. Mark von Stachelberg, published 1950 by de Gruyter Co, Berlin W 35).

EXAMPLE 1

844 parts of maleic anhydride and 1,200 parts of fully demineralized water are introduced into a stirred 5 liter stainless steel reactor. The reactor is flushed 3 times in succession with nitrogen under 5 bar pressure, and is then heated, under the same pressure, to 130° C. Thereafter a mixture—introduced over 8 hours—of 1,000 parts of acrylic acid and 706 parts of fully demineralized water, and a mixture—introduced over 9 hours—of 267 parts of 30% strength hydrogen peroxide and 270 parts of fully demineralized water are added uniformly at 130° C. The batch is then heated for a further 2 hours at 130° C. The clear, pale yellowish copolymer solution has a solids content of 44.3%. The K value of the copolymer is 10.5. The residual monomeric acrylic acid content is 1.3% (based on solids).

EXAMPLE 2

588 parts of maleic anhydride and 1,200 parts of fully demineralized water are introduced into an apparatus as described in Example 1, and, after having flushed the apparatus with nitrogen, are heated to 110° C. A mixture—introduced over 3 hours—of 1,623 parts of acrylic acid and 997 parts of fully demineralized water and a solution—introduced over 6 hours—of 154.3 parts of 30% strength hydrogen peroxide and 375 parts of fully demineralized water are then added at 110° C. The batch is thereafter heated to 120° C. and allowed to continue to react for 2 hours at this temperature. The clear yellowish solution has a solids content of 45.3%; the copolymer has a K value of 20. The residual maleic acid content is 2.5%.

EXAMPLE 3

200 parts of fully demineralized water and 120 parts of maleic acid are brought to the boil—100° C.—in a stirred 2 liter reactor with reflux condenser. 480 parts of acrylic acid diluted with 100 parts of fully demineralized water are then added over 5 hours, and 18 parts of 30% strength hydrogen peroxide dissolved in 100 parts of fully demineralized water over 6 hours. The mixture is then heated for a further 2 hours at 100° C. The clear, colorless solution has a solids content of 59.6%; the K value of the copolymer is 36. The residual monomeric maleic acid content is 2.2%.

EXAMPLE 4

1,200 parts of maleic anhydride are introduced into an apparatus as described under 1, and after flushing the latter with nitrogen the solution is heated to 120° C. under pressure. A mixture of 97 parts of fully demineralized water and 1,624 parts of acrylic acid is then added over 8 hours, and a solution of 309 parts of 30% strength hydrogen peroxide in 221 parts of fully demineralized water over 10 hours. Heating is then continued for 2 hours at 120° C. The clear yellowish solution has a solids content of 45.6%, and the K value of the copolymer is 14. The monomeric maleic acid content is 0.62%.

EXAMPLE 5

141.1 parts of maleic anhydride and 240.9 parts of fully demineralized water are introduced into a stirred 1 liter reactor with reflux condenser and brought to the boil-about 100° C. A mixture of 315 parts of acrylic acid and 200 parts of fully demineralized water is then added over 8 hours, and a solution of 9 parts of sodium persulfate in 50 parts of fully demineralized water and a solution of 2.25 parts of sodium disulfite in 50 parts of fully demineralized water are each added over 9 hours. Heating is then continued for 2 hours at 100° C. The clear, colorless solution has a solids content of 39.7%; the K value of the copolymers is 32. The monomeric maleic acid content is 4%.

The Examples which follow relate to the copolymers prepared according to the preferred embodiment of the process, wherein components a) and b) and-if used-c) are present in the partially neutralized form which has been defined.

General method of preparation

The desired amount of dicarboxylic anhydride, dicarboxylic acid or fully or partially NaOH-neutralized dicarboxylic acid is introduced into a 1.5-fold amount of fully demineralized water in a stainless steel reactor equipped with a stirrer. The reactor is flushed 3 times with nitrogen under 5 bar pressure and is then heated to the desired reaction temperature. A mixture—introduced over 5 hours—of the desired amount of monocarboxylic acid or its sodium salt—depending on the desired overall degree of neutralization—and the 1.5-fold amount of fully demineralized water, and a mixture—introduced over 6 hours—of the desired amount of initiator (as a 30% strength aqueous solution) and the 1.5-fold amount of fully demineralized water are then added uniformly. The batch is then heated for a further 2 hours at the chosen reaction temperature. A solution of about 40% strength by weight results. The K values and residual dicarboxylic acid contents, and the special reaction conditions, may be seen from the Table which follows.

TABLE

| Example No. | Composition [% by weight] | Degree of neutralization [%] of the initial dicarboxylic acid charge | Degree of neutralization [%] of the monocarboxylic acid feed (including other monomers) | Overall degree of neutralization [%] |
|---|---|---|---|---|
| 5 | 70 AAC/30 MAc | 0 | 0 | 0 |
| 6 | " | 100 | 0 | 35 |
| 7 | " | 90 | 29.7 | 50 |
| 8 | " | 90 | 90 | 90 |
| 9 | " | 100 | 100 | 100 |
| 10 | " | 0 | 0 | 0 |
| 11 | " | 90 | 0 | 32 |
| 12 | " | 100 | 0 | 35 |
| 13 | " | 40 | 40 | 40 |
| 14 | " | 90 | 50 | 65 |
| 15 | " | 90 | 90 | 90 |
| 16 | " | 80 | 20 | 41 |
| 17 | 60 AAc/40 MAc | 90 | 0 | 41 |
| 18 | 50 AAc/50 MAc | 90 | 0 | 45 |
| 19 | 70 AAc/30 MAc | 90 | 0 | 31 |
| 20 | 80 AAc/20 CAc | 100 | 0 | 22 |
| 21 | 50 AAc/50 IAc | 90 | 0 | 48 |
| 22 | 60 AAc/30 MAc/10 MM | 90 | 0 | 33 |
| 23 | 60 AAc/30 MAc/10 VS | 90 | 0 | 40 |
| 24 | 60 AAc/30 MAc/10 AA | 90 | 0 | 35 |
| 25 | 60 AAc/30 MAc/10 HPA | 90 | 0 | 35 |

| Example No. | Operating temp. [°C.] | Amount of initiator [%], solids/solids | Initiator | Residual dicarboxylic acid content [%] based on solids | K value |
|---|---|---|---|---|---|
| 5 | 100 | 2.0 | $H_2O_2$ | 6.7 | 64.4 |
| 6 | 100 | 2.0 | $H_2O_2$ | 0.5 | 69.0 |
| 7 | 100 | 2.0 | $H_2O_2$ | 0.3 | 68.4 |
| 8 | 100 | 2.0 | $H_2O_2$ | 5.4 | 42.7 |
| 9 | 100 | 2.0 | $H_2O_2$ | 13.0 | 28.0 |
| 10 | 120 | 2.0 | $H_2O_2$ | 2.0 | 39.1 |
| 11 | 120 | 2.0 | $H_2O_2$ | 0.05 | 40.9 |
| 12 | 120 | 2.0 | $H_2O_2$ | 0.2 | 20.6 |
| 13 | 120 | 2.0 | $H_2O_2$ | 0.3 | 40.2 |
| 14 | 120 | 3.2 | $H_2O_2$ | 0.12 | 24.5 |
| 15 | 120 | 3.6 | $H_2O_2$ | 1.6 | 19.8 |
| 16 | 130 | 4.0 | $H_2O_2$ | 0.04 | 37.1 |
| 17 | 120 | 2.0 | $H_2O_2$ | 0.20 | 32.2 |
| 18 | 120 | 2.0 | $H_2O_2$ | 0.53 | 24.2 |
| 19 | 100 | 4.0 | $Na_2S_2O_8$ | 0.03 | 79.7 |
| 20 | 120 | 2.0 | $H_2O_2$ | 0.14 | 28.3 |
| 21 | 100 | 4.0 | $H_2O_2$ | 0.28+ | 48.9 |
| 22 | 120 | 2.0 | $H_2O_2$ | 0.90 | 27.0 |
| 23 | 120 | 2.0 | $H_2O_2$ | 0.09 | 25.6 |
| 24 | 120 | 2.0 | $H_2O_2$ | 0.07 | 36.9 |

TABLE-continued

| 25 | 120 | 2.0 | H₂O₂ | 0.09 | 25.6 |

*obtained from the hydrogenation iodine number (polarography fails in this case)

Abbreviations:
AAc = acrylic acid
MAc = maleic acid
CAc = citraconic acid
IAc = itaconic acid
MM = monomethyl maleate
VS = vinylsulfonic acid (Na salt)
AA = acrylamide
HPA = hydroxypropyl acrylate
Examples 5, 8, 9, 10 and 11 are for comparison

We claim:

1. A process for the preparation of copolymers containing monoethylenically unsaturated monocarboxylic acids and dicarboxylic acids as copolymerized monomer units, which comprises copolymerizing:
    a) 10-60% by weight, based on the total weight of the monomers, of a monoethylenically unsaturated dicarboxylic acid having 4-6 carbon atoms or an anhydride thereof or an alkali metal salt thereof;
    b) 40-90% by weight of a monoethylenically unsaturated monocarboxylic acid having 3-10 carbon atoms or an alkali metal salt thereof; and
    c) 0-20% by weight of another monoethylenically unsaturated monomer not having carboxyl groups which is copolymerizable with a) and b); in an aqueous medium in the presence of 0.5-5% by weight, based on the total weight of the monomers, of a water-soluble initiator consisting of hydrogen peroxide with a total monomer content of from 20-70% by weight at 60°-150° C. and wherein monomers a) and b) are 20-80% neutralized during said polymerization reaction, thereby forming a copolymer having less than 1.5% by weight of unreacted dicarboxylic acids therein.

2. The process of claim 1, wherein said dicarboxylic acid is maleic acid, and said monocarboxylic acid is acrylic acid or methacrylic acid or salts thereof.

3. The process of claim 1, wherein said monomers a) and b) are 30-70% neutralized during said polymerization reaction.

4. The process of claim 1, wherein said monomer a) is present in the amount of 20-45% by weight, based on the total weight of the monomers, and said monomer b) is present in the amount of 55-80% by weight, based on the total weight of the monomers.

5. The process of claim 1, wherein the aqueous solution of monomers for copolymerization contains from 20-70% by weight of the total monomers.

6. The process of claim 5, wherein the aqueous solution of monomers for copolymerization contains from 40-60% by weight of total monomers.

* * * * *